April 9, 1929.  J. H. GODFREY  1,708,267
VALVE
Filed Oct. 29, 1926
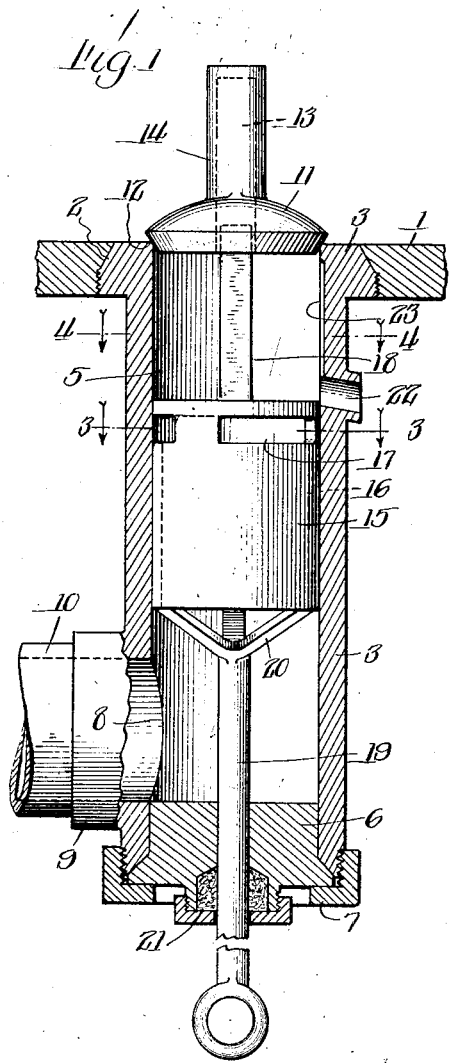
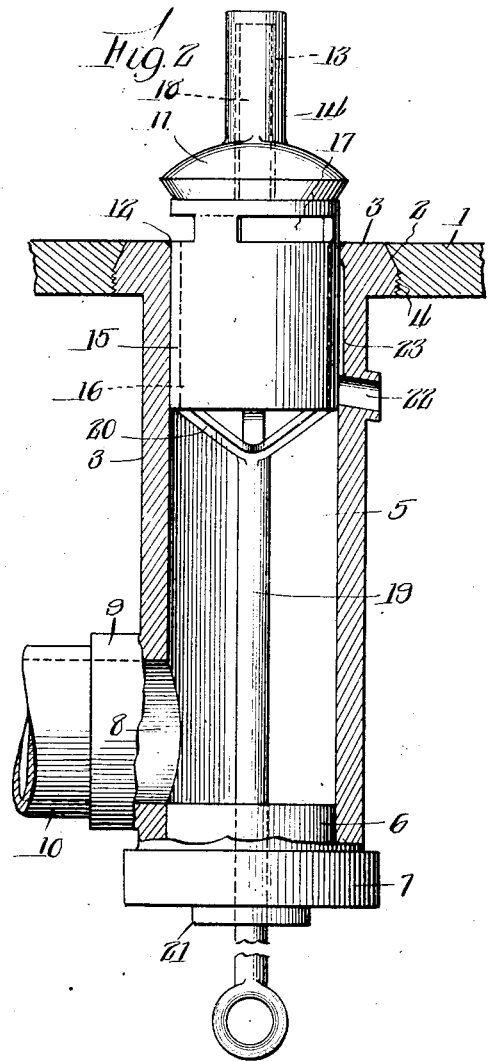
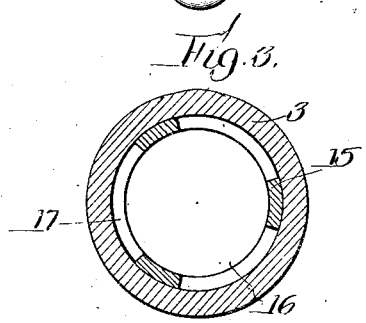
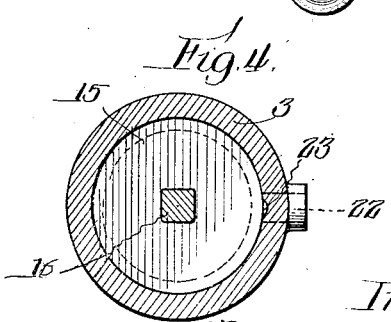
Inventor
Joseph H. Godfrey,
By [signature]
Atty.

Patented Apr. 9, 1929.

1,708,267

UNITED STATES PATENT OFFICE.

JOSEPH H. GODFREY, OF CHICAGO, ILLINOIS, ASSIGNOR TO THE CREAMERY PACKAGE MFG. COMPANY, OF CHICAGO, ILLINOIS, A CORPORATION OF ILLINOIS.

VALVE.

Application filed October 29, 1926. Serial No. 144,944.

The invention relates more particularly to valves for the control of edible fluids commonly known as sanitary valves.

In milk pasteurization one of the commonly practiced methods is to hold quantities of the milk at a pre-determined temperature for a pre-determined time in suitable containers, the containers being filled and emptied through piping controlled by sanitary valves. It will be obvious that any leakage or failure in these valves will permit the uncontrolled flow to or from the container of a quantity of milk which has not been held for the required time at the necessary temperature. If such leakage is permitted to pass through the apparatus with the properly pasteurized milk the latter is in danger of reinoculation by the undestroyed bacteria in the milk which has escaped the prescribed treatment.

It is the principal object of this invention to provide an improved sanitary valve for controlling the filling and emptying of pasteurizing holders which is constructed to intercept and direct outwardly from the main passages any leakage occurring in the valve when it is in closed position.

A further object is to provide a leakage diverting valve structure which does not trap within the structure a quantity of the milk or other liquid with the closing operation of the valve, thus eliminating the waste of the milk otherwise trapped and discharged through the leakage diverting passage.

Other objects and advantages will be apparent in the following detailed description of a preferred embodiment of the invention which I have selected for illustration in the accompanying drawings. It will be understood, however, that various changes in form, construction and arrangement may be made by those skilled in the art without departing from the scope and spirit of the invention as expressed in the appended claims.

Referring to the drawings, Fig. 1 is a sectional elevation of the valve structure in closed position. Fig. 2 is a similar sectional elevation in opened position. Fig. 3 is a sectional plan taken on the plane of the line 3—3 in Fig. 1. Fig. 4 is a sectional plan view taken on the plane of the line 4—4 in Fig. 1.

The construction herein disclosed is especially adapted to use as an inlet valve in controlling an inlet opening in the bottom of a holding container, in which case the elimination of trapped liquid is of especial advantage. However, the construction as illustrated is equally applicable to the control of a bottom outlet opening from a holding container. For clarity of statement, the following description and the claims treat of the valve as an inlet valve, it being understood that the terms "inlet" and "outlet" are interchangeable as applied therein to the main openings of the valve structure.

The reference numeral 1 indicates the bottom wall of a liquid holding container having an inlet opening 2 preferably formed for the seating therein flush with the wall 1 of the upper end of a valve casing 3, removably secured therein as by the screw threads 4. The casing 3 encloses a preferably cylindrical chamber 5, with open upper end and having a removable lower end closure 6 normally secured in position by means of a flanged cap 7 having screw threaded engagement with the end of the casing. A lateral inlet 8 opens into the chamber 5, the casing being provided outwardly thereabout with an annular flange 9 suitable for connection therewith of a supply pipe 10.

Seated at the upper end of the casing or outlet opening from the chamber 5 is a valve 11, preferably of conical seat engaging contour, and normally seated in the margin 12 of the valve outlet opening. The valve 11 is provided with an axial bore 13 extending upward through a boss 14 formed on the valve 11, the bore opening inwardly into the valve chamber 5.

The valve chamber 5 is controlled between its inlet and outlet openings by a reciprocatory piston 15 having its bearing upon the side walls of the chamber and with an imperforate head effecting a closure of the chamber. The piston 15 is preferably formed with a tubular skirt extending from the imperforate head, forming a passage 16 centrally of the piston and opening into the inlet end portion of the chamber 5. The piston 15 is further provided with lateral ports 17 opening into the central passage 16 within the piston and controlled by the side walls of the chamber 5.

Mounted upon the head of the piston 15 is a stem 18 extending axially into the bore 13 provided in the outlet valve 11. The stem 18 is preferably of square cross section, the corners of the stem being in operative bearing relation with the sides of the bore 13, but permitting the escape of pocketed air as the stem enters the cylindrical bore.

The piston 15 is operatively supported by a rod 19 illustrated herein as having arms 20 at its upper end attached to the skirt of the piston, the rod 19 extending through the end closure plug 6 and provided at its outer end with suitable structure for the attachment of operating means (not shown). The end plug 6 is preferably provided with a conventional packing gland 21 about the operating rod 19.

The casing 3 is also provided with a lateral auxiliary outlet passage 22, positioned just above the lowermost position of the head of the piston 15, and leading outwardly of the chamber independently of the normal valve passages. A chanel or recess 23 is formed in the wall of the chamber 5 extending from the auxiliary outlet 22 to a point adjacent the valve seat 12 in the outlet opening.

In operation, the valve parts, positioned as illustrated in Fig. 1, effect a double closure of the normal passage through the chamber 5, the outlet opening being closed against the liquid in the holding container by the valve 11, and the chamber being further closed against the liquid in the supply line by the imperforate head of the piston 15. Any leakage occurring past the piston 15 or the outlet valve 11, while the valve parts are in this closed position, will flow over the imperforate piston head and drain outwardly of the valve chamber through the auxiliary outlet 22.

To open the valve structure, the piston 15 is moved to the outlet end of the chamber and partially through the outlet opening, the piston head abutting the under face of the valve 11 and lifting it from its seat, the valve 11 being retained in position for re-seating by the stem 18. The piston 15 is moved sufficiently outward of the outlet opening to uncover the lateral ports 17, thereby opening communication through the central passage 16 in the piston and the lower portion of the chamber 5 to the supply inlet opening 8, the piston in this position effecting the closure of the auxiliary outlet 22 and its connecting channel 23.

Upon the movement of the piston 15 to closed position, the piston ports 17 are closed by withdrawal within the chamber wall, and the valve 11 is seated at the outlet opening. The further withdrawal of the piston 15 tends to create a vacuum between the seated valve 11 and the imperforate piston head, which is relieved by the channel 23 extending adjacent the outlet valve seat and which opens above the piston as the latter is withdrawn to normal closed position.

The closure of the valve outlet opening 12 and the piston ports 17 while the valve 11 and the head of the piston are still in abutting relation, prevents the trapping of any liquid between those members, and when the auxiliary outlet 22 is uncovered by the piston in movement to its final position, there is no wastage of such trapped liquid through that outlet.

I claim as my invention:

1. A device of the class described, comprising a casing having a chamber with an inlet opening and an outlet opening, a valve controlling said outlet opening, and a piston supported in said chamber independently of said valve for operatively controlling said chamber between said inlet and said outlet openings, said piston having a passage communicating with the inlet portion of said chamber and with a lateral port opening in said piston, said piston being operable to open said outlet valve and uncover said lateral port outwardly of said outlet opening.

2. A device of the class described, comprising a casing having a chamber with an inlet opening and an outlet opening, a valve controlling said outlet opening and a piston operatively controlling said chamber between said inlet and said outlet openings, said piston having a passage communicating with the inlet portion of said chamber and having a lateral port communicating with said passage, said piston being operable in one direction to effect the opening of said outlet valve and to extend partially through said outlet opening to uncover said port and in the other direction to permit seating of said outlet valve with a substantial space between said valve and said piston.

3. A device of the class described, comprising a casing having a chamber with an inlet and an outlet opening, a valve controlling said outlet opening and having a recess opening inwardly thereof, a piston controlling said chamber between said inlet and said outlet openings, said piston having a passage communicating with the inlet portion of said chamber and having a lateral port communicating with said passage, and a stem carried by said piston adapted to enter said recess and position said outlet valve in relation to said piston, said piston being operable to open said outlet valve and uncover said port outwardly of said outlet opening.

4. A device of the class described, comprising a casing having a chamber with an inlet opening and an outlet opening and with an auxiliary outlet passage intermediate of said inlet and said outlet openings, a valve normally seated in and controlling said outlet opening, and a piston controlling said chamber between said inlet and said outlet openings, said piston having a passage communicating with the inlet portion of said chamber and with a port opening in the lateral wall of said piston, said piston being operable selectively into position within said chamber whereat said auxiliary outlet passage is open between said piston and said outlet valve, and into position partially through said outlet opening whereby said outlet valve is moved from its seat and said port is uncovered outwardly of said outlet opening.

5. A device of the class described, comprising a casing having a chamber with an inlet opening and an outlet opening and with an auxiliary outlet passage intermediate of said inlet and said outlet openings, there being a connecting passage in the wall of said chamber opening thereinto adjacent said outlet opening and extending into communication with said auxiliary outlet passage, a valve normally seated in and controlling said outlet opening, and a piston controlling said chamber between said inlet and said outlet openings, said piston having a passage communicating with the inlet portion of said chamber and with a port opening in the lateral wall of said piston, said piston being operable selectively into position within said chamber whereat said auxiliary outlet passage is open between said piston and said outlet valve, and into position partially through said outlet opening whereby said outlet valve is moved from its seat and said port is uncovered outwardly of said outlet opening.

6. A device of the class described, comprising a casing having a chamber with endward inlet and outlet openings and with a lateral passage opening substantially inward from said outlet opening, a piston controlling said chamber and having means for opening and closing communication between said inlet and outlet openings, and a valve normally seated in and controlling said outlet opening, said piston being operable into abutment with said outlet valve to move said valve from its seat and being reversely operable to seat said valve and withdraw therefrom to open said lateral passage, said casing having a channel opening into said chamber and extending from said lateral passage to adjacent said outlet opening.

In witness whereof I have hereunto attached my signature.

JOSEPH H. GODFREY.